United States Patent Office 3,238,157
Patented Mar. 1, 1966

3,238,157
METHOD OF MAKING A FILLED CELLULAR SILICONE ELASTOMER AND CELLULAR PRODUCT OBTAINED THEREBY
Frederick A. Smith, Kenmore, N.Y., assignor to Union Carbide Corporation, a corporation of New York
No Drawing. Filed Aug. 2, 1963, Ser. No. 299,478
20 Claims. (Cl. 260—2.5)

This application is a continuation-in-part application of application Serial No. 36,753 which was filed on June 17, 1960, and which has since been abandoned.

This invention relates to cell-forming vulcanizable siloxane compositions, to the dimensionally controllable cellular silicone (polysiloxane) elastomers prepared therefrom and to processes for the production thereof.

Heretofore it has been known to produce silicone elastomers by curing a mixture of a diorganopolysiloxane with a reinforcing filler by various means. The silicon elastomers thus produced are solid elastomers cured to a definite volume having a uniform density.

It has also been known that by incorporating a blowing agent into such elastomers prior to curing that silicone elastomer foams are produced. However, the foamed elastomers thus produced do not have a uniform density throughout the cured elastomer and also such foamed elastomers expand during the curing step and thus it is difficult to obtain elastomers wherein the dimensions of the final product are essentially the same as the starting silicone gum composition, that is, it is very difficult to control the volume and dimensions of the final foamed elastomeric product.

It is an object of this invention to produce silicone elastomers which are curable to a volume which is substantially equal to the original uncured volume of the siloxane gum composition, but which have a significantly lower apparent density.

It is a further object of this invention to provide for processes for the production of dimensionally controllable cellular silicone elastomers.

This invention also includes compositions of matter that are curable to silicone elastomers, which elastomers can be further treated to provide dimensionally controllable cellular silicone elastomers.

According to the present invention, equivalent volume cured elastomers of lower apparent density are obtained by incorporating in vulcanizable (curable) siloxane gum compounds particulate, solid void-producing matter which is insoluble in and non-reactive with said gum, infusible and non-decomposing at the curing temperature of said gum compound, but can be readily removed from such gum compound after it has been cured to an elastomer (for example, by leaching with water or by heating to decompose or volatilize), thereby leaving in the cured elastomer voids which correspond in size to the particle size of the particulate solid matter removed. The void-containing elastomer can thereafter be subjected to a post-cure to stabilize said elastomer by removing therefrom the volatile low-molecular weight siloxanes.

The dimensionally controllable cellular silicone elastomers of this invention have apparent densities in the range of from about 0.20 gram per cubic centimeter to about 1.00 gram per cubic centimeter, the apparent density being dependent upon the amount and particle size of the particulate solid matter incorporated in the siloxane gum composition prior to curing.

The curable siloxane gum compositions of this invention comprise (1) an organopolysiloxane gum, (2) a reinforcing filler, such filler being employed in amounts from about 20 to 50 parts by weight per 100 parts by weight of (1), and (3) a void-producing material, such void-producing material being employed in amounts from 10 to 700 parts (preferably 10 to 500 parts) by weight per 100 total parts by weight of (1) and (2). In addition, the compositions of this invention can contain hydroxylated silicon compounds or ethoxysilicon compounds and other compounds, such as hydroxylated organic compounds and organic surfactants, which render the compositions more readily plasticizable after standing and facilitate removal of the void-producing matter. The compositions of this invention can also include curing agents and non-reinforcing fillers.

The curable siloxane gum compositions of this invention are produced by admixing at room temperature or above the above-described ingredients until a uniform dispersion of the ingredients is obtained. It is preferred that in forming this admixture that all of the ingredients except the particulate, solid, void-producing matter be admixed and blended so as to obtain a uniform dispersion. The void-producing material is then added to the admixture and the mixing continued until a uniform dispersion is obtained. The void-producing material can also be added simultaneously with the other materials but in such instance it has been found that it is more difficult to obtain a uniform dispersion and as a result the cellular structure of the elastomer is not as uniform.

Suitable apparatus for preparing the curable siloxane gum compositions of this invention include milling rolls operating at differential speeds, internal mixers and the like. According to the milling technique, the organopolysiloxane is charged onto the roll mill and milled to give a uniform sheet. The reinforcing filler is then added in suitable amounts and the milling continued until the filler is uniformly dispersed throughout the organopolysiloxane. Other additives, for example, plasticizers such as a hydroxylated silicon compound or an alkoxysilicon compound and, if desired, coloring agents are added and milling continued to obtain a uniform dispersion. If desired, a curing catalyst can be added at this point. Such dispersions of organopolysiloxane, filler, and if desired, a plasticizer, coloring agent and curing agent are commonly called "silicone gum compounds." Thereafter the particulate, solid, void-producing matter is added with continuous milling to obtain a uniform dispersion of the void-producing material through the silicone gum compound.

The curable silicone (poly-siloxane) gum composition is then cured to a silicone elastomer containing the particulate solid void-producing matter by conventional techniques. For example, the composition can be cured by irradiation with an electron beam or with gamma rays. Compositions containing a tetralkysilicate or polysilicate and a metal salt of an aliphatic acid, such as lead octoate or tin octoate, are curable at room temperature. The gum compositions can also be cured to elastomers by adding thereto an organic peroxide by milling and subsequently heating the resulting mixture to a temperature sufficiently elevated to cause the peroxide to decompose thereby curing the curable siloxane gum composition to an elastomer. In any curing technique which requires heating, it is essential that such temperature be lower than that required to volatilize, decompose or disassociate the particulate, solid, void-producing matter.

The silicone elastomer thus obtained is then treated to remove substantially all the particulate, solid, void-producing matter to produce a dimensionally controllable, cellular silicone elastomer wherein the cells are substantially the same dimensions as the void-producing matter thus removed.

The void-producing matter can be removed by leaching with water if such void-producing matter is water-soluble or by heating the cured elastomer to a temperature of from above the curing temperature up to about 500° F. where the void-producing matter is volatile, sublimes or decomposes into gaseous products and diffuses from the cured elastomer.

In removing water-soluble particulate, solid, void-producing matter, the cured elastomer can be subjected to alternate compression, relaxation and flexing whereby the particulate matter is more readily dissolved by water. The elastomer is then leached with water for from 2 to 48 hours.

In removing particulate, solid, void-producing matter from the cured elastomer where such void-producing matter is volatile, sublimes or decomposes into gaseous products, the cured elastomer is placed in an oven maintained at a temperature above the curing temperature of the elastomer and up to about 500° F. for a period of from about 4 to 48 hours. The void-producing matter is thereby removed from the cured elastomer leaving a dimensionally controllable cellular silicone elastomer having voids or cells of substantially the same size as the void-producing matter removed.

As indicated, the dimensionally controllable cellular silicone elastomers of this invention can be subjected to post-curing treatments. Such post-curing heat treatment is conducted at temperatures of about 350° F. and preferably at temperatures of about 480° F. for periods of about 24 hours in a heated circulating air oven. Such post-curing treatments serve to stabilize the physical properties of the dimensionally controllable cellular silicone elastomer and also to improve the compression set properties thereof. Such treatments do not have a detrimental effect on any of the properties of the cellular elastomers of this invention.

It is to be particularly noted that unlike foamable compositions containing a blowing agent, the curable siloxane gum compositions herein described and contemplated retain a substantially constant volume during curing and during removal of the void-producing matter.

The amount of the void-producing matter employed in the curable siloxane gum compositions of this invention can be from about 10 parts to about 700 parts by weight per 100 total parts by weight of the organosiloxane gum and reinforcing filler. Preferably, the void-producing matter is employed in amounts of at least 25 parts by weight per 100 total parts of the organopolysiloxane gum and reinforcing filler.

The average particle size of the void-producing matter can be from about 2 microns to about ⅛ inch in diameter, the choice of particle size being dependent upon the size of the cells desired in the dimensionally controllable cellular silicone elastomer to be produced.

The apparent density of the dimensionally controllable cellular silicone elastomer produced will, of course, be dependent upon the amount and particle size of the void-producing matter employed. Thus, for example, if cured cellular elastomers having apparent densities of about 0.75 to 1.00 gram per cubic centimeter are desired, small amounts of the larger particles size void-producing matter are employed, whereas, if cured cellular elastomers having apparent densities of from about 0.20 to 0.75 gram per cubic centimeter are desired, larger amounts of the small particle size particulate void-producing matter should be employed. Mixtures of large and small particulate void-producing matter can also be employed so as to give a maximum packing effect and thus lower apparent densities.

The void-producing matter which is useful in the preparation of the dimensionally controllable cellular silicone elastomers of this invention includes crystalline or amorphous solids which are inert with respect to the gum composition and particularly during curing of the silicone elastomer. Where a heat-curing step is employed in producing the silicone elastomer such void-producing matter in addition to not interfering with the cure, should not melt, vaporize, sublime or decompose at the heat-curing temperature.

Void-producing matter useful in the compositions of this invention include solid crystalline or amorphous materials which sublime or melt to liquids and volatilize or those which disassociate or decompose at temperatures above the curing temperature of the elastomer and below about 500° F. Also useful as void-producing materials in the compositions of this invention are solids which are water-soluble, which do not decompose at the curing temperature nor interfere with the curing mechanism.

Illustrative of the water-soluble, void-producing materials that are useful in the compositions of this invention are inorganic compounds, for example, the halide salts such as, lithium, sodium, potassium, and ammonium bromides, chlorides, and the like; the sulfate salts such as lithium, sodium, potassium sulfates and the like; the nitrate salts such as lithium, sodium, potassium nitrates and the like; and salts of organic acids such as, potassium acetate, sodium acetate, sodium benzoate, and the like; and organic compounds such as, sucrose, urea, tartaric acid, oxalic acid and the like.

Illustrative of the void-forming materials that are useful in the compositions of this invention and which can be removed by heating at temperatures above the curing temperature of the elastomer and below about 500° F. are solids which sublime, such as oxalic acid, alpha-aminoanthraquinone, ortho-anthranilic acid, chloroanthraquinone, chlorobenzoic acid, dichloroanthraquinone, isatin, and the like; solids which melt to liquids which slowly evaporate, such as urea, phthalic anhydride, citric acid, tartic acid, adipic acid, beta-naphthol and the like; and solids which disassociate on heating above the curing temperature, such as ammonium chloride, ammonium formate, and the like.

The starting organopolysiloxane gums used in this invention include both homopolymeric and copolymeric organopolysiloxanes. The organosiloxanes contain siloxane groups represented by the formula:

(A)

wherein R and R' are monovalent organic radicals, such as monovalent hydrocarbon radicals, halogenated monovalent hydrocarbon radicals, cyanoaryl groups, cyanoalkyl groups wherein the cyano group is interconnected to the silicon atom through at least 2 carbon atoms and nitroaryl groups. The ratio of the organic groups R and R' to silicon atoms in the starting organopolysiloxane gum is from 1.95 to 2.05.

Illustrative of the monovalent organic radicals that are represented by R and R' in Formula A are the olefinically unsaturated monovalent hydrocarbon radicals such as alkenyl groups (for example, the vinyl and the allyl groups) and the cycloalkenyl groups (for example, the cyclohexenyl group). The preferred monovalent olefinically unsaturated hydrocarbon group is the vinyl group.

Illustrative of the monovalent organic radicals that are represented by R and R' in Formula A are alkyl groups (for example, methyl, ethyl, and propyl groups and the like); aryl groups (for example, phenyl, tolyl groups and the like); aralkyl groups (for example, benzyl and phenylethyl groups and the like); and cycloalkyl groups (for example, cyclohexyl and cyclopentyl groups and the like).

Illustrative of the halogenated monovalent hydrocarbon radicals that are represented by R and R' in Formula A are chloromethyl, trichloromethyl, chloropropyl, chlorophenyl, bromophenyl, trifluoromethylphenyl and the like; the perfluoroalkyl groups such as 2-trifluoromethylpropyl, hexafluoroisohexyl, 3,3-trifluoropropyl, 5,5,5-trifluoro - 2 - (trifluoromethyl)amyl, 5,5,6,6,6 - penta - fluoro-2(perfluoroethyl)hexyl and the like.

Illustrative of the cyanoaryl groups that are represented by R and R' in Formula A are cyanophenyl groups such as para-cyanophenyl, ortho-cyanophenyl, meta-cyanophenyl and the like and bromo-cyanophenyl groups such as 2-bromo-5-cyanophenyl, 2,5-dibromo-4-cyanophenyl, 5-bromo-2,4-dicyanophenyl groups and the like.

Illustrative of the nitroaryl groups that are represented by R and R' in Formula A are, for example, nitrophenyl, nitro-naphthyl and the like. The group R', but not R, can also be hydrogen.

Useful organopolysiloxane gums can contain siloxane groups that are represented by Formula A wherein either the same organic groups are attached to the silicon atoms (e.g., the dimethylsiloxane, diphenylsiloxy and diethylsiloxy groups) or different organic groups are attached to the silicon atoms (e.g., the methylphenylsiloxy (phenylethyl)methylsiloxy, ethylphenylsiloxy, methylvinylsiloxy and phenylvinylsiloxy groups).

When olefinically unsaturated monovalent hydrocarbon radicals are present in the organopolysiloxane gum, it is preferred that from 0.037 to 0.74 percent of the monovalent organic radicals be such olefinically unsaturated monovalent hydrocarbon radicals, although amounts of such radicals up to about 3.0 percent are frequently useful.

In producing the curable siloxane gum compositions of this invention, any of the filler materials of the highly-reinforcing type as exemplified by carbon blacks and certain inorganic compounds, or any suitable combination of such filler materials, can be employed in the production of elastomers in accordance with heretofore customary procedures. Of the inorganic fillers it is preferred to employ finely-divided silica-base fillers of the highly-reinforcing type which are characterized by particle diameters of less than 500 millimicrons and by surface areas of greater than 50 square meters per gram. Inorganic filler materials of a composition, or of a particle diameter and surface area, other than those preferred can be employed in combination with the preferred fillers with good results. By way of illustration, such filler materials as titania, iron oxide, aluminum oxide, and the like as well as those inorganic filler materials known as non-reinforcing fillers (extenders) which include, among others, diatomaceous earth, calcium carbonate, and quartz are preferably employed in combination with highly-reinforcing silica fillers. The non-reinforcing fillers (extenders) can be included in the compositions of this invention in amounts up to about 150 parts by weight per part of organopolysiloxane gum.

The use of a non-reinforcing filler is frequently desirable in order to increase the modulus (compression load deflection) of the cured, dimensionally controllable cellular silicone elastomers of this invention. Modulus is defined as the ratio of stress to strain, that is, the tendency of a material to deform in response to an applied force. The more easily deformable a material, the lower the modulus.

The reinforcing or non-reinforcing fillers can, if desired, be treated with a mono-, di- or trihydrocarbonchlorosilane such as trimethylchlorosilane prior to use.

The reinforcing and non-reinforcing fillers useful in the compositions of this invention are water-insoluble (that is not soluble to any significant degree) and are non-volatile at temperatures below about 500° F.

In producing the compositions of this invention, it is often desirable to employ additives which render the silicone gum compounds containing void producing matter more readily plasticizable after standing and which facilitate removal of the void producing matter from the cured elastomer compositions. These additives, which can be termed "processing aids" comprise four general classes of compounds: (1) water soluble organic surfactants of the anionic and neutral non-ionic types, (2) water soluble monomeric hydroxyorganic compounds, (3) organosilicon compounds containing silicon-bonded hydroxy and/or alkoxy groups, and (4) low molecular weight trihydrocarbonsiloxy end-blocked dihydrocarbonpolysiloxane oils.

Water-soluble organic surfactants (or surface active agents) which do not contain silicon and which are useful in the compositions of this invention can be conveniently classified as anionic and non-ionic. These surface active agents are generally characterized structurally by an elongated non-polar portion having but little affinity for water or water-soluble systems and a short polar portion possessing high affinity for water and water-soluble systems. The non-polar portion is hydrophobic and the polar portion is hydrophilic.

If the elongated, non-polar portion of the molecule is included in the *anion* in the aqueous solution, the surfactant is called *anionic*. Sodium stearate is a typical anionic surface active agent which ionizes in water to form a sodium cation and the long-chain stearate anion which appears to be responsible for the surface activity. In the anionic class, the most commercially important anion groups are carboxy (—COOH), sulfonic acid (—SO$_3$H) and sulfuric ester (—OSO$_3$H).

The non-ionic surface active agents do not dissociate in water but nevertheless are characterized by a relatively polar portion and a relatively non-polar portion. An example is sorbitan mono-oleate.

In the majority of surfactants useful in the invention, the long-chain non-polar portion of the molecule is derived from a straight-chain saturated hydrocarbon having from about 8 to about 24 carbon atoms. Generally, this long-chain portion is also a mixture of homologus radicals rather than a clearly defined individual radical. Thus, the molecule will generally contain a mixture of compounds ranging from C$_8$ to C$_{24}$ but especially rich in the hydrocarbon for which the compound is named. The "lauryl" surfactants thus would be rich in C$_{10}$–C$_{12}$ chains.

The preferred water soluble anionic surfactants useful in this invention are alkali metal salts of hydrocarbon carboxylic acids and hydrocarbon sulfonic acids wherein the hydrocarbon moiety contains from 8 to about 24 carbon atoms. These anionic surfactants are well known and include, for example, alkali metal salts of hydrocarbon carboxylic acids, such as sodium stearate, potassium laurate, sodium oleate, lithium palmitate, sodium para-decylbenzoate and the like; alkali metal salts of hydrocarbon sulfonic acids such as isopropyl naphthalene sodium sulfonate, dodecylbenzene sodium sulfonate, disodium dodecyldiphenyl disulfonate, lithium dodecyl naphthalene sulfonate, sodium lauryl sulfonate and the like.

Any non-ionic neutral surfactant can be used in the present invention. The term "neutral surfactant," as used herein, means that adding a substantial amount of the surfactant to water (or to an aqueous solution) does not change the pH of the water or solution by any significant amount.

A preferred class non-ionic neutral surfactants are those represented by the formula:

(B)
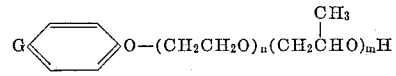

wherein G is an alkyl group containing from 8 to 16 carbon atoms, such as octyl, nonyl, isodecyl, and hexadencyl; $n$ is an integer having a value from zero to about 100; $m$ is an integer having a value from zero to about 50; and the sum of $n$ and $m$ is from at least 4 to about 100.

Examples of the compounds of Formula B are:

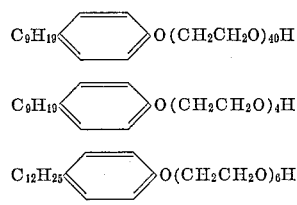

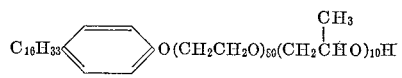

and the like.

Another preferred class of non-ionic neutral surfactants are those represented by the formula:

(C)
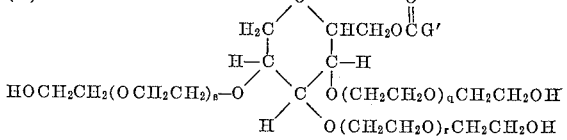

wherein G' is a saturated or unsaturated aliphatic hydrocarbon group containing from 8 to about 24 carbon atoms and q, r, and s are integers each having a value of 4 or greater. The compounds of formula C are commercially available surfactants generally referred to as "polyoxyethylene sorbitan mono-fatty acid esters" and include, for example, polyoxyethylene sorbitan monolaurate, polyoxyethylene sorbitan mono-palmitate and poly-oxyethylene sorbitan monooleate.

The integers q, r and s do not have sharply defined values but vary over a range of values. Any surfactant of Formula C will thus be a mixture of compounds having different values for the integers q, r and s.

Other non-ionic neutral surfactants useful in this invention include sorbitan monooleates, monostearates and monolaurates, and acetylated lanolin alcohols, polyethylene glycol tert-dodecyl thioether, and the like.

It should be noted that mixtures of organic surfactants can also be used in compositions of the present invention in order to achieve desired results.

The preferred water soluble monomeric hydroxyorganic compounds useful in the compositions of this invention are mono-, di-, and tri-hydroxy substituted alkanes containing from one to about 6 carbon atoms, for example, monohydroxy alcohols such as methanol, isopropanol and butanol, polyhydroxy alcohols such as ethylene glycol, propylene glycol, 1,6-hexamethylene glycol, glycerol and 1,2,6-hexanetriol.

The hydroxy-containing silicon compounds suitable for use in the compositions of the present invention are preferably organo-substituted hydroxysilanes and hydroxypolysiloxanes. While the silanes usually contain only a single silicon atom, the polysiloxanes, wherein the silicon atoms are joined by oxygen atoms, can contain from two up to thirty-five and more silicon atoms to the molecule. When polysiloxanes are employed, it is preferred that they be linear in structure, although they can be of the cross-linked type, and contain not more than about twenty silicon atoms to the molecule. Stated in other terms, the preferred hydroxy containing polysiloxanes contain from two to about twenty diorganosiloxy units to the molecule.

The hydroxy-containing silicon compounds which can be employed contain at least one hydroxyl group to the molecule. Preferably, such materials contain at least two hydroxy groups to the molecule. Typical of the hydroxysilanes which can be employed are: the saturated hydrocarbon-substituted hydroxysilanes which include diphenyldihydroxysilane, trimethylhydroxysilane, phenyldimethylhydroxysilane, and the silicates which include partially hydrolyzed tetraethylsilicate as well as the condensed polymers thereof, and such silicates as diethoxy-di-(2-ethylhexane-diol-1,3) silicate, and the like.

The hydroxy-containing organo-substituted polysiloxanes which can be employed in the compositions of this invention contain as described above, at least one hydroxy group to the molecule and preferably contain at least two hydroxy groups to the molecule. In most instances, such polysiloxanes can contain from two to six and more hydroxy groups per molecule. Most suitable for use are those hydroxy-containing organo-substituted polysiloxanes prepared by hydrolysis and condensation procedures of the above organo-substituted hydroxysilanes.

Thus, for example, in the production of a linear hydroxy end-blocked hydrocarbon-substituted polysiloxane oil, suitable for use in the invention, predetermined amounts of the cyclic tetramer of dimethylsiloxane and water are mixed and placed within a pressure vessel and heated to a temperature of about 300° C. for a period of time of about 14 hours to obtain a low-molecular weight dimethylpolysiloxane oil having one hydroxy group bonded to each of the terminal silicon atoms thereof.

The hydroxy end-blocked hydrocarbon-substituted polysiloxane oils suitable for use in the present invention are those relatively low molecular weight polysiloxane oils whose polymer chains have at least two and as much as thirty-five and more dihydrocarbonsiloxy units ($R_2SiO$) per molecule and which contain an average of at least one hydroxyl group bonded to each of the terminal silicon atoms of the molecule. Such polysiloxanes may be represented by the general formula:

(D)
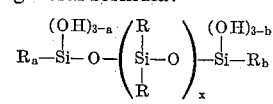

wherein R is as above defined with reference to Formula A; a has a value of from 0 to 2; b has a value of from 0 to 3; and x has a value of from 2 to 35.

The alkoxy-containing silicon materials suitable for use in the compositions of the present invention are preferably organo-substituted alkoxysilanes and alkoxypolysiloxanes. While the silanes usually contain only a single silicon atom, the polysiloxanes, wherein the silicon atoms are joined by oxygen atoms, can contain from two up to thirty-five and more silicon atoms to the molecule. When polysiloxanes are employed, it is preferred that they be linear in structure, although they can be of the cross-linked type, and contain not more than about twenty silicon atoms to the molecule. Stated in other terms, the preferred alkoxy containing polysiloxanes contain from about two to about twenty diorganosiloxy units to the molecule.

The alkoxy-containing silicon compounds which can be employed contain at least one alkoxy group to the molecule. Preferably such materials contain at least two alkoxy groups to the molecule. Such silanes have the general formula:

wherein R is as above defined with reference to formula A; R" is alkyl or aryl; and n has a value of from 0 to 3.

Alkoxy-endblocked polysiloxanes suitable for use in the present invention have the general formula:

(E)
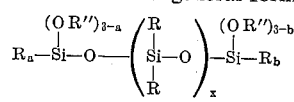

wherein R is as above defined with reference to Formula A; R" is a member selected from the group consisting of alkyl and aryl radicals; a has a value of from 0 to 2; b has a value of from 0 to 3; x has a value of from 2 to 35; and R as well as R" can be different group members in a molecule. Preferably, R" is an alkyl group having from 1 to 6 carbon atoms. Illustrative of the alkyl groups that are represented by R" are methyl, ethyl, propyl, octyl, octadecyl and the like. Illustrative of aryl groups that are represented by R" are phenyl, tolyl, xylyl, naphthyl and the like.

Typical of the alkoxysilanes which can be employed are: the saturated hydrocarbon-substituted alkoxy-silanes which include trimethylethoxysilane, dimethyldiethoxysilane, methyltriethoxysilane, ethyltriethoxysilane, diethyldiethoxysilane, triethyl propoxysilane, phenyltriethoxysilane, diphenyldiethoxysilane, triphenylethoxysilane as well as the mixed saturated hydrocarbon-substituted alkoxysilanes, such as methylethyldipropoxysilane, methylphenyldiethoxysilane and the like; the unsaturated hydrocarbon-substituted alkoxysilanes, which include vinyltriethoxysilane, ethylvinyldiethoxysilane, phenylvinyldiethoxysilane, divinyldipropoxysilane, allyltriethoxysilane, methylallyldiethoxysilane, ethylcyclohexenyldiethoxysilane, and the like; the halogen-substituted hydrocarbon alkoxysilanes which include alpha-chloromethyltriethoxysilane, gamma-chloropropyltriethoxysilane, gamma-chloropropylmethyldiethoxysilane, gamma-deltadichlorobutyltriethoxysilane, para-chlorophenyltriethoxysilane, ortho-para-dichlorophenyltriethoxysilane, and the like, the cyanoalkylalkoxysilanes which include beta-cyanoethyltriethoxysilane, gamma - cyanopropylmethyldiethoxysilane, delta-cyanobutylphenyldipropoxysilane, and the like; the silicates which include tetraethylsilicate as well as the condensed polymers thereof, and such silicates as diethoxy-di(2-ethylhexanedoil-1,3) silicate, diethoxy-di(triethanolamine) silicate, and the like.

The alkoxy-containing organo-substituted polysiloxanes which can be employed in the composition of this invention contain as described above, at least one alkoxy group to the molecule and preferably contain at least two alkoxy groups to the molecule. In most instances, such polysiloxanes can contain from two to six and more alkoxy groups per molecule. Most suitable for use are those alkoxy-containing organo-substituted polysiloxanes prepared by hydrolysis and condensation procedures of the above described organo-substituted alkoxysilanes.

The preferred low molecular trihydrocarbonsiloxy endblocked dihydrocarbonpolysiloxane oils useful in this invention are those represented by the formula:

(F)
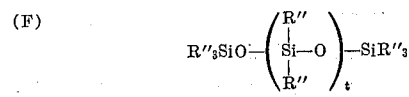

wherein R″ has the meaning defined hereinabove with reference to Formula E and $t$ is an integer having a value from 4 to about 20.

The processing aids described above can be incorporated into the compositions of this invention by two general methods: (1) the void-producing matter can be mixed with or coated with the processing aid and then combined with the other ingredients in the silicone gum compound or (2) the processing aid can be mixed in with one or more of the ingredients in the silicone gum compound prior to addition of the void producing matter.

Where the void-producing material is to be removed by leaching it is preferable to use a water soluble processing aid. All of the processing aids, or those fragments of the processing aids which do not become cured into the elastomer, are completely removed from the cured elastomer by volatilization during the post-curing treatment at about 480° F.

The amounts of processing aid employed can vary from about 2 weight percent to about 20 weight percent or greater based on the weight of the void producing matter. Where the void producing matter and processing aid are mixed together directly, smaller amounts are generally required than where the processing aid is combined with other ingredients prior to addition of the void producing matter. Preferably the void producing material should be insoluble or only slightly soluble in the processing aid. Where the void-producing matter and processing aid are mixed together directly, the void producing matter should not be soluble to any significant extent in the processing aid.

The use of processing aids is generally preferred for one or more of the following reasons:

(a) The processing of the silicone gum compounds is made easier. For example, the addition of 300 parts of urea to 100 parts of filled silicone elastomer base is relatively difficult to accomplish on a roll mill. The material becomes a dry, caky, lumpy material which falls from the rolls and resists dispersion to a uniform homogeneous mixture. The material cannot be sheeted from the rolls in smooth sheets suitable for further molding and processing, but is obtained as a crumbly, lumpy powder of compacted pieces. The addition of the processing aid softens and lubricates the mixtures. They do not fall from the rolls, but can be well mixed and sheeted from the rolls in soft, pliable, homogeneous, uniform well-mixed sheets.

(b) The processing properties of the gum compound are especially improved. Normally, at high loadings of the void producing substance, extreme molding pressures are required to force the dry, crumbly, material into homogeneous moldings. The material does not flow sufficiently to fill contoured molds and poor, non-uniform moldings are obtained. The processing aid permits immediate flow at moderate pressure, or low pressure, excellent reproduction of mold contours, and uniform, faithful, moldings having a minimum of internal discontinuities.

(c) In many cases, the removal of the void producing material is accelerated by the processing aid. For example, the leaching of urea from a relatively high density foam is difficult due to the thicker cell walls under these conditions. The use of urea coated with a water soluble processing aid can reduce the leaching time by as much as 50 percent.

(d) The upper limit of the amount of void producing substance which can be added, is increased by the addition of appropriate processing aids. Normally, a loading of 500 parts of certain void producing materials per 100 parts of polysiloxane base is a practical upper limit. The use of processing aids permits addition of 700 parts or more of the void producing material.

The curing agents that can be employed to cure the compositions of this invention to elastomers are any of the curing agents which have been heretofore employed in the production of silicone elastomers. Thus, for example, the curing agent can be a room temperature curing agent, organic peroxide curing agent, gamma rays or electron beam irradiation.

Illustrative of the room temperature curing agents are mixtures of tetra-alkylsilicates or polysilicates with metal salts of aliphatic acids. Illustrative of the tetra-alkylsilicates are tetra-ethylsilicate, tetra-propylsilicate, tetra-butyl-silicate and the like. Illustrative of the poly-silicates are the products resulting from the partial hydrolysis of the aforementioned tetra-alkylsilicates. Illustrative of the metal salts of the aliphatic acids are the lead, tin and zinc octoates, undecanoates, octadecanoates and the like.

Illustrative of the organic peroxide curing agents that can be employed to produce the elastomers of this invention are the dialkyl peroxides, the diacyl peroxides, the alkylacyl peroxides and the like. The dialkyl peroxides are, for example, di-tertiarybutyl peroxide, tertiary-butyltriethylmethylperoxide, tertiary-butyl-tertiarytriptyl peroxides and the like and the substituted dialkyl peroxides such as dicumyl-peroxide. The diacyl peroxides are, for example, benzoyl peroxide, 2,4-dichlorobenzoyl peroxide, 1,4-dichlorobenzoyl peroxide, monochlorobenzoyl peroxide and the like. The alkyl-acyl peroxides are, for example, tertiary-butyl perbenzoate, tertiary-butyl peracetate and the like. When carbon black filled silicone gum compositions of the invention are to be cured, it is preferred that catalysts such as dicumyl peroxide and di-tertiary-butyl peroxide be employed for best results.

The amount of the organic peroxide used as a curing agent in this invention is not narrowly critical. In practice the amount of the curing agent may vary from as little as 0.1 parts by weight of the organopolysiloxane gum. When organopolysiloxane gums that cure through alkenyl groups are employed, the preferred amount of the peroxide curing agent is from 0.5 part to 3.0 parts by weight per 100 parts by weight of the gum. When organopolysiloxane gums that cure through other groups are employed, the preferred amount of the peroxide curing agent is from 1.5 parts to 5.0 parts by weight per 100 parts by weight of the gum. Greater or lesser amounts of the peroxides may be used but no commensurate advantage is gained thereby.

The following examples serve to illustrate this invention. In the examples and elsewhere in the specification all parts are parts by weight unless otherwise specified. Compression load at a specified percent deflection is the force (load) required to compress the elastomer slab by the specified percent of its original (unloaded) thickness.

PREPARATION OF A TYPICAL SILICONE GUM CMPOUND

A silicone gum compound was prepared by milling together at ambient temperatures 100 parts of a dimethylpolysiloxane gum containing 0.20 part of combined methylvinylsiloxy units, 30 parts of a mixture of finely-divided reinforcing silica fillers and 10 parts of an ethoxy end-blocked dimethylpolysiloxane having an ethoxy content of 12 percent by weight until a uniform dispersion was obtained. This is silicone gum compound A.

A silicone gum compound was prepared by milling together at ambient temperatures 100 parts of a dimethylpolysiloxane gum containing 0.20 part of combined methylvinylsiloxy units and 12 parts of diphenylsiloxy units, 38 parts of a mixture of finely-divided reinforcing silica fillers and 10 parts of an ethoxy end-blocked dimethylpolysiloxane having an ethoxy content of 12 percent by weight until a uniform dispersion was obtained. This is silicone gum compound B.

A silicone gum compound was prepared by milling together at ambient temperatures 100 parts of a dimethylpolysiloxane gum containing 1.0 part of combined methylvinylsiloxy units and 12 parts of diphenylsiloxy units, 38 parts of a mixture of finely-divided reinforcing silica fillers and 10 parts of an ethoxy end-blocked dimethylpolysiloxane having an ethoxy content of 12 percent by weight until a uniform dispersion was obtained. This is silicone gum compound C.

Example 1

The silicone gum compound A as hereinbefore described (100 parts) was placed on a two roll differential speed rubber mill and milled at ambient temperature to a uniform sheet. To the uniform sheet 1 part of a 40 percent by weight mixture of 2,4-dichlorobenzoyl peroxide in a dimethylsilicone oil, was added and milled therewith at a temperature of below 50° C. to give a uniform dispersion. Oxalic acid (100 parts) which had been dried for 16 hours at 100° C. and which had a particle size small enough to pass through a 200 mesh screen was added and the milling continued below 50° C. until a dispersion was obtained. The resulting mixture was sheeted from the mill and formed into a slab approximately 6 x 6 x .080 inches. The slab was placed between sheets of a polyethyleneterephthalate and then placed in a standard mold (6 x 6 x .075 inches) and cured to an elastomer by heating at 250° F. for 15 minutes.

A sample of the cured elastomer was placed in a forced air oven and heated to 300° F. for 24 hours to volatilize the oxalic acid and was then heated at 480° F. for 24 hours. There resulted a cellular silicon elastomer which contained small voids or cells having substantially the same dimensions as the particles of oxalic acid, the voids being uniformly distributed throughout the cellular silicone elastomers. The apparent density of the cellular silicone elastomer was 0.82 g./cc.

The second sample of the cured elastomer was heated in an oven at 300° F. for six hours, then 18 hours at 400° F. to yield a cellular silicone elastomer having an apparent density of 0.77 g./cc., a tensile strength of 100 p.s.i., and an elongation of 240 percent.

The dimensions of the cured samples were approximately 6 x 6 x .075 inches, illustrating the close dimensional control over the final cured elastomer.

A silicone elastomer prepared from the same silicone gum compound without employing any oxalic acid has an apparent density of 1.2 g./cc.

Example 2

To 100 parts of the silicone gum compound A hereinbefore described was added 1 part of a 40 percent by weight mixture of 2,4-dichlorobenzoyl peroxide in a dimethylsiloxane oil and the mixture milled at ambient temperatures to give a uniform dispersion. To this mixture 100 parts of urea (particle size 30 mesh or lower) and milling continued below 50° C. to obtain a uniform dispersion of the urea and the silicone gum compound. The resulting composition was placed between polyethyleneterephthalate sheets in a standard mold and cured to an elastomer by heating to 250° F. for 15 minutes.

Samples of the elastomer were treated as follows:

(1) The urea was removed from the elastomer by submerging it in boiling water for 48 hours, the boiling water being changed frequently. The elastomer was then heated in a circulating air oven to 300° F. for 1 hour and then at 480° F. for 48 hours to produce a cured cellular silicone elastomer having a tensile strength of 150 p.s.i., and elongation of 280% and an apparent density of 0.71 gram per cc.

(b) The urea was removed from the elastomer by heating the elastomer to 300° F. for 18 hours, then 6 hours at 400° F. and then at 480° F. for 48 hours to obtain a cured cellular silicone elastomer having a tensile strength of 150 p.s.i., an elongation of 300% and an apparent density of 0.69 gram per cc.

Example 3

To 100 parts of the silicone gum compound A hereinbefore described was added 1 part of a 40 weight percent mixture of 2,4-dichlorobenzoyl peroxide in a dimethylsiloxane oil and the mixture milled at ambient temperatures to give a uniform dispersion. To this mixture 100 parts of ammonium chloride (particle size passes through 30 mesh retained on 60 mesh screen) and milling continued below 50° C. to obtain a uniform dispersion of the ammonium chloride and the silicone gum compound. The resulting composition was placed between polyethyleneterephthalate sheets in a standard mold and cured to an elastomer by heating to 250° F. for 15 minutes.

Samples of the elastomer were treated as follows:

(a) The ammonium chloride was removed from the elastomer by submerging it in boiling water for 24 hours, the boiling water being changed frequently. The elastomer was then heated to 300° F. for 1 hour and then at 480° F. for 24 hours to produce a cured cellular silicone elastomer having a tensile strength of 200 p.s.i., an elongation of 350% and an apparent density of 0.75 gram per cc.

(b) The ammonium chloride was removed from the elastomer by heating it to 400° F. for 6 hours, and then at 480° F. for 24 hours to obtain a cured cellular silicone elastomer having a tensile strength of 140 p.s.i., an elongation of 350% and an apparent density of 0.71 gram per cc.

A similar preparation was made employing 100 parts of ammonium formate (particle size passes through 30 mesh and is retained on a 60 mesh screen) in place of the ammonium chloride. After curing to an elastomer, the elastomer was heated at 300° F. for 18 hours and at 480° F. for 48 hours. There was obtained a cured cellular elastomer having an apparent density of 0.77 g./cc.

Example 4

To 100 parts of the silicone gum compound A hereinbefore described was added 1 part of a 40 percent by weight mixture of 2,4-dichlorobenzoyl peroxide in a dimethylsiloxane oil and the mixture milled to give a uniform dispersion. The rolls were adjusted to give a 1/8 inch bite and to this mixture 150 parts of prilled urea (substantially in the form of particle size spherical pellets 1/8 inch and smaller in diameter) and milling continued below 50° C. to obtain a uniform dispersion of the urea and the silicone gum compound. During the milling some of the pellets of urea were broken. The resulting composition was placed between polyethyleneterephthalate sheets in a standard mold and cured to an elastomer by heating to 250° F. for 15 minutes.

The urea was removed from the elastomer by heating to 300° F. for 18 hours, and then at 480° F. for 24 hours to obtain a cured cellular silicone elastomer having a tensile strength of 50 p.s.i., an elongation of 150% and an apparent density of 0.60 gram per cc.

*Example 5*

To 100 parts of the silicone gum compound A hereinbefore described was added 1 part of a 40 percent by weight mixture of 2,4-dichlohobenzoyl peroxide in a dimethylsiloxane oil and the mixture milled to give a uniform dispersion. To this mixture 200 parts of phthalic anhydride (commercial flake particle size ⅛ inch diameter and about .01 inch thick) and milling continued below 50° C. to obtain a uniform dispersion of the phthalic anhydride in the silicone gum compound. During milling some of the flakes were broken into smaller particles. The resulting composition was placed between polyethyleneterephthalate sheets in a standard mold and cured to an elastomer by heating to 250° F. for 15 minutes.

The phthalic anhydride was removed from the elastomer by heating to 300° F. for 64 hours, and then at 480° F. for 24 hours to obtain a cured cellular silicone elastomer having a tensile strength of 30 p.s.i., an elongation of 350% and an apparent density of 0.61 gram per cc.

*Example 6*

To 150 parts of the silicone gum compound A hereinbefore described was added 1 part of a 40 percent by weight mixture of 2,4-dichlorobenzoyl peroxide in a dimethylsiloxane oil and the mixture milled below 50° C. to give a uniform dispersion. The rolls of the mill were adjusted to give a ⅛ inch bite and to this mixture 210 parts of prilled urea (substantially in the form of spherical pellets ⅛ inch and smaller in diameter) and milling continued below 50° C. to obtain a uniform dispersion of the urea and the silicone gum compound. The resulting composition was placed between polyethyleneterephthalate sheets in a standard mold and cured to an elastomer by heating to 250° F. for 5 minutes.

The urea was removed from the elastomer by heating to 300° F. for 24 hours and then at 480° F. for 24 hours to obtain a cured cellular silicone elastomer having an apparent density of 0.55 gram per cc.

*Example 7*

To 50 parts of the silicone gum compound as hereinbefore described was added 0.5 part of a 40 percent by weight mixture of 2,4-dichlorobenzoyl peroxide in a dimethylsiloxane oil and the mixture milled below 50° C. to give a uniform dispersion. To this mixture 125 parts of urea (particle size through 30 mesh retained on 100 mesh) and milling continued below 50° C. to obtain a uniform dispersion of the urea and the silicone gum compound. The resulting composition was placed between polyethyleneterephthalate sheets in a standard mold and cured to an elastomer by heating to 250° F. for 15 minutes.

The urea was removed from the elastomer by heating to 300° F. for 18 hours, and then at 480° F. for 24 hours to obtain a cured cellular silicone elastomer having an apparent density of 0.5 gram per cc.

*Example 8*

To 150 parts of the silicone gum compound A hereinbefore described was added 1.5 parts of a 40 percent by weight mixture of 2,4-dichlorobenzoyl peroxide in a dimethylsiloxane oil and the mixture milled at ambient temperatures to give a uniform dispersion. To this mixture 250 parts of urea (particle size 100 mesh or lower) and milling continued below 50° C. to obtain a uniform dispersion of the urea in the silicone gum compound. The resulting composition was placed between polyethyleneterephthalate sheets in a standard mold and cured to an elastomer by heating to 240° F. for 7 minutes.

The urea was removed from the elastomer by heating to 300° F. for 24 hours to produce a cured cellular silicon elastomer having cells of substantially the same size as the urea particles and an apparent density of 0.5 gram per cc.

*Example 9*

Two silicone elastomer formulations were prepared according to the following recipes:

Recipe (1):
    100 parts silicone gum compound B
    3 parts of a 50 weight percent dispersion of 2,4-dichlorobenzoylperoxide in a dimethylpolysiloxane fluid curing catalyst
    150 parts urea Recipe (2):
    100 parts silicone gum compound B
    3 parts of a 50 weight percent dispersion of 2,4-dichlorobenzoylperoxide in a dimethylpolysiloxane fluid curing catalyst
    150 parts urea
    40 parts non-reinforcing silica filler Both formulations were cured to elastomers by heating at 230° F. for 15 minutes and the urea removed by leaching with water. The cured cellular elastomers had the following physical properties:

| Recipe | Density, grams/cc. | Compression load at 20% deflection, p.s.i. |
|---|---|---|
| (1) | 0.55 | 10 |
| (2) | 0.70 | 50.5 |

*Example 10*

A silicone elastomer formulation was prepared according to the following recipe:

100 parts silicone gum compound B
3 parts of a 50 weight percent dispersion of 2,4-dichlorobenzoylperoxide in a dimethylpolysiloxane fluid curing catalyst
12 parts hydroxy endblocked dimethylpolysiloxane fluid, 5 centipoise viscosity
600 parts urea The formulation was cured to an elastomer by heating at 230° F. for 15 minutes and the urea removed by leaching with water. The cured cellular silicone elastomer had a density of 0.24 g./cc. and a compression load at 20 percent deflection of 0.8 p.s.i.

*Example 11*

Two silicone elastomer formulations were prepared according to the following recipes:

Recipe (1):
    100 parts silicone gum compound B
    4.5 parts of a 50 weight percent dispersion of 2,4-dichlorobenzoylperoxide in a dimethylpolysiloxane fluid curing catalyst
    160 parts urea Recipe (2):
    100 parts silicone gum compound C
    4.5 parts of a 50 weight percent dispersion of 2,4-dichlorobenzoylperoxide in a dimethylpolysiloxane fluid curing catalyst
    160 parts urea Both formulations were cured to elastomers by heating at 230° F. for 15 minutes and the urea removed by leaching with water. The cured cellular elastomers had the following physical properties:

| Recipe | Density, grams/cc. | Compression load at 32% deflection, p.s.i. |
|---|---|---|
| (1) | 0.52 | 18.0 |
| (2) | 0.53 | 57.0 |

In the following Examples 12–20 the Williams Plastometer values, as described in A.S.T.M. D–926 (Parallel Plate Plastometer), have been used to provide quantitative comparative data on the plasticity of silicone gum compounds of this invention. The lower the value (millimeters of flow under constant pressure), the softer and more plastic is the material.

*Example 12*

A silicone elastomer formulation was prepared according to the following basic recipe:

100 parts silicone gum compound B
3 parts of a 50 weight percent dispersion of 2,4-dichlorobenzoylperoxide in a dimethylpolysiloxane fluid curing catalyst
300 parts urea prills The material crumbled, fell from the rolls, was very difficult to handle, and showed the following Plastometer values:

|  | mm. |
|---|---|
| Initial | 4.9 |
| 1 week | 8.3 |
| 2 weeks | 10.0 |
| 3 weeks | 10.4 |
| 4 weeks | 10.6 |
| 5 weeks | 11.7 |

The material was also very difficult to mold into a uniform flat sheet as it tended to crumble and break apart as it was forced out under molding pressure.

The addition of 10 parts of a polyoxyethylene sorbitan monooleate neutral non-ionic surfactant to the 300 parts of urea gave a material which was readily mixed on the roll mill and came off in large compacted sheets with a slight tendency to split. The Plastometer values are shown below:

|  | mm. |
|---|---|
| Initial | 3.9 |
| 1 week | 4.6 |
| 2 weeks | 5.1 |
| 3 weeks | 5.7 |
| 4 weeks | 5.8 |
| 5 weeks | 6.0 |

This material easily and readily molded into a flat sheet which cured upon the application of heat to the mold. The urea was readily leached out and the sheet heat cured to 480° F. in an air circulating oven to produce a flat, white, sheet of cured silicone elastomer sponge.

*Example 13*

The addition of 10 parts of a polyoxyethylene sorbitan monooleate neutral non-ionic surfactant having a lower average molecular weight (shorter oxyethylene chains on the average) than the surfactant of Example 12 to the same basic receipe used in Example 12 showed similar behavior on the roll mill, and was soft enough to readily mold into a smooth, homogeneous sheet of the desired size and dimensions. This material also cured well but it was somewhat more difficult to leach out all the urea and surfactant.

*Example 14*

Five parts of ethylene glycol were added to 300 parts of urea and the mixture then slowly added to 100 parts of silicone gum compound B containing 3 parts of a 50 weight per cent despersion of 2,4-dichlorobenzoylperoxide in a dimethylpolysiloxane fluid catalyst in a roll mill. (Four parts of ethylene glycol produced a relatively wet, sticky mass of the urea, but in compounding it dried up and gave a compacted material.) The formulation molded well and gave a final cured cellular silicone having a density of 0.35 g./cc. While there may be slight solubility of urea in ethylene glycol, the final density showed this caused no loss of cellular structure as both urea and glycol were removed by the water leaching process.

*Example 15*

The addition of 5, 10 and 15 parts of glycerol to three samples of urea which were compounded in the same basic receipe described in Example 12 gave three sheets of elastomer formulation which were readily stripped from the mill and found to be well mixed and homogeneous. These sheets were easily molded to produce large, flat, smooth, uniform moldings which were readily cured. The urea leached out rapidly and the moldings showed no color change on heating to 480° F., indicating complete removal of all organic matter. The Plastometer valves are as shown below:

|  | 5 parts glycerol, mm. | 10 parts glycerol, mm. | 15 parts glycerol, mm. |
|---|---|---|---|
| Initial | 4.2 | 3.6 | 3.1 |
| 1 week | 4.2 | 3.7 | 3.2 |
| 2 weeks |  | 4.0 | 3.4 |
| 3 weeks | 4.4 | 4.1 | 3.6 |
| 4 weeks | 4.7 | 4.1 | 3.5 |
| 5 weeks | 4.8 | 4.2 | 3.9 |

The following typical properties were measured on the molded, leached, and post-cured sheets of cellular silicone elastomers:

|  | 5 parts glycerol | 10 parts glycerol | 15 parts glycerol |
|---|---|---|---|
| Density, g/cc | 0.35 | 0.34 | 0.33 |
| Compression load at 30% deflection, p.s.i. | 4.5 | 3.2 | 3.0 |

A slight decrease in density, and consequently compression load deflection occurred as the glycerol concentration was increased. Since the glycerol was removed from the elastomer, it added to the void volume of the silicone, thus decreasing the density of the final material.

*Example 16*

Ten parts and fifteen parts of 1,2,6-hexanetriol was added to two portions of the same basic receipe described in Example 12. In both cases there was excellent mixing with no crumbling or falling from the rolls, and the formulations stripped from the rolls in large flat sheets ready for molding. The formulations molded readily, cured well, leached exceptionally quickly as evidenced by the time required for removal of all the urea, and gave white sheets of cellular silicone elastomer. The physical property values are as shown below:

| Plastometer Values: | 10 parts 1,2,6-hexanetriol | 15 parts 1,2,6-hexanetriol |
| --- | --- | --- |
| Initial | 3.9 mm. | 3.7 mm. |
| 1 week | 4.1 mm. | 3.7 mm. |
| 2 weeks | 4.6 mm. | 4.1 mm. |
| 3 weeks | 4.7 mm. | 4.2 mm. |
| 4 weeks | 5.0 mm. | 4.2 mm. |
| 5 weeks | 5.0 mm. | 4.3 mm. |
| Density, g./cc. | 0.34 | 0.33. |
| Compression load at 30% deflection | 2.3 p.s.i. | 2.5 p.s.i. |

*Example 17*

Two silicone elastomer formulations were prepared according to the following receipes:
Receipe (1):

100 parts silicone gum compound B
    3 parts of a 50 weight percent dispersion of 2,4-dichlorobenzoylperoxide in a dimethylpolysiloxane fluid curing agent
    300 parts sucrose The material handled very badly on the roll mill, but was finally molded under excessive molding pressure to give a cured sheet. Leaching in running hot (190° F.) water for 42 hr. failed to remove all of the high loading of relatively less soluble (than urea) sucrose from this 8-in. x 8-in. x 0.200-in. thick sheet as evidenced by turning dark when heated to 480° F. in an air circulating oven.

Recipe (2):

100 parts silicone gum compound B
    3 parts of a 50 weight percent dispersion of 2,4-dichlorobenzoylperoxide in a dimethylpolysiloxane fluid curing catalyst
    300 parts surcose coated with 15 parts 1,2,6-hexanetriol The material showed excellent mixing properties and came off the roll mill in fairly large sheets. It was easily molded and cured into 8-in. x 8-in. x 0.200-in. thick sheets. These were leached 16 hr. in running hot (190° F.) water to produce white sheets of cellular silicone elastomer with no darkening on heating to 480° F. The 1,2,6-hexanetriol performed not only as a plasticizer but also as a leaching aid. The cured cellular silicone elastomer showed the following physical properties.

Density _____ g./cc.___ 0.39
Compression load at 30% deflection _____ p.s.i.___ 1.6

*Example 18*

Two silicone elastomer formulations were prepared according to the following receipes:

100 parts silicon gum compound B
    3 parts of a 50 weight percent dispersion of 2,4-dichlorobenzoylperoxide in a dimethylpolysiloxane fluid curing catalyst
    300 parts of urea coated with 10 parts of ethoxy endblocked dimethylpolysiloxane oil, 8 centipoise viscosity The material mixed readily, sheeted from the roll mill in compacted strips. It molded readily and under moderate pressure to give excellent moldings which were leached in 16 hr. and post-cured without showing any organic residue. However, the shrinkage was slightly higher than normally encountered (as evidenced by slightly thinner sheets than are usually obtained by the molding procedure used) due to the volatilization of some of the ethoxy endblocked polysiloxane during the post-curing cycle. The properties were as follows:

Density _____ g./cc.___ 0.39
Compression load at 30% deflection _____ p.s.i.___ 3.2

Recipe (2): This recipe is the same as Recipe (1) hereinabove except that 10 parts of the same ethoxy endblocked dimethylpolysiloxane fluid was added to the silicone gum compound rather than to the urea. The formulation was a bit more difficult to mill, and slightly drier to handle. However, the material molded and cured well.

Plastometer studies showed that while the mixing characteristics were improved, both formulations tended to harden after storage for periods of 5 weeks.

*Example 19*

A silicone elastomer formulation was prepared according to the following recipe:

100 parts silicone gum compound B
3 parts of a 50 weight percent dispersion of 2,4-dichlorobenzoylperoxide in a dimethylpolysiloxane fluid curing catalyst
300 parts prilled urea
10 parts hydroxy endblocked dimethylpolysiloxane fluid, 50 centipoise viscosity This material showed appreciable improvement in mixing and handling qualities. It molded well, but after removal of the urea showed a slight increase in shrinkage on heating to 480° F. following the leaching cycle. The physical properties were as follows:

Plastometer Values:
    Initial _____ mm__ 3.7
    1 week _____ mm__ 4.7
    2 weeks _____ mm__ 4.8
    3 weeks _____ mm__ 4.9
    Density _____ g./cc__ 0.40
    Compression load at 30% deflection_____ p.s.i__ 5.0

*Example 20*

On an external mixer of the roll mill type, the addition of 400 parts of urea to 100 parts of silicone gum compound is generally impossible and internal mixers are required. The following batch, containing a processing aid was however mixed in a roll mill:

100 parts silicone gum compound B
3 parts of a 50 weight percent dispersion of 2,4-dichlorobenzoylperoxide in a dimethylpolysiloxane fluid curing catalyst
600 parts of prilled urea
20 parts hydroxy endblocked dimethylpolysiloxane fluid, 50 centipoise viscosity The recipe mixed with some difficulty, did not sheet, but showed a tendency to adhere to the rolls, a desirable feature for attainment of good mixing. It gave a homogeneous material which came off the rolls as a soft powder. It molded under relatively high molding pressure to give a uniform, smooth, well molded sheet, from which the urea was leached very rapidly. The density was found to be uniform throughout the molding, 0.24 g./cc., and the compression load at 30% deflection was 1.0 p.s.i.

Dimensionally controllable, cellular silicone elastomers are also obtained where a methylethylpolysiloxane gum containing 0.2 percent by weight combined methylvinylsiloxy units is substituted for the dimethylpolysiloxane gum in the previous examples.

It will be appreciated that in milling operations the ultimate particle size of the particulate, solid, void-producing matter is dependent upon several factors including frangibility of the particulate matter, duration of milling and dimension of the milling bite of the rolls.

The dimensionally controllable, cellular silicone elastomers of this invention are characterized in that the voids or cells have substantially the same dimensions as the particulate, solid, void-producing matter employed to produce the voids or cells. These dimensionally controllable cellular silicone elastomers are also characterized in that the elastomer does not expand on the removal of the particulate, solid, void-producing matter, but undergo so slight volume contraction in the amounts usually associated with conventional silicone elastomers, i.e., the outer dimensions of the dimensionally controllable, cellular silicone elastomer remain substantially constant or are subject to linear shrinkage in amounts of up to about 10%.

An unexpected advantage of the process of the present invention is that the void producing matter can be removed from the cured elastomer by leaching or volatilization even where the individual particles of void producing matter are each completely surrounded by cured silicone elastomer.

An important property of the cured cellular silicone elastomer of this invention is that the cured elastomers do not incur any significant volume change on production of the cellular elastomer. This property is extremely important in that cellular silicone elastomers of particular size and shape can be molded directly with very close dimensional control (dimensional tolerance). The production of cellular silicone elastomer sections of unusual size or shape and with close dimensional tolerance cannot be produced from conventional silicone elastomers. This is because conventional silicone elastomers expand during the blowing (sponging) operation and, if confined in a mold, blow non-uniformly and with the formation of channels and cavities, and undergo expansion when the mold is opened. In addition, a section of conventional cellular silicone elastomer cannot be cut or milled to a chosen shape with close dimensional tolerance because the cutting or milling destroys the surface skin of the elastomer, and the skin ordinarily contributes in large measure to the desirable physical properties of conventional cellular silicone elastomers.

Extremely thin sections of cellular silicone elastomer cannot be produced by the use of conventional blowing agents. The process of this invention, however, makes possible the production of extremely thin (and uniform) sections of cellular silicone elastomer having thicknesses on the order of 0.075 inch or less.

The method of the present invention produces cellular silicone elastomers with uniform density, excellent physical properties, and extremely close dimensional tolerance by a single direct molding operation, thus providing an extremely important advance in the technology of silicone elastomers.

The dimensionally controllable cellular silicone elastomers of this invention are useful as sealing gaskets for use at high and low temperatures and as cushioning material, particularly where both high and low temperature flexibility is desired.

What is claimed is:

1. A composition of matter curable to a silicone elastomer which comprises in admixture, (1) an organopolysiloxane gum, (2) from 20 to 50 parts by weight of a reinforcing filler per 100 parts by weight of said gum, said filler being solid, water-insoluble and non-volatile at temperatures below 500° F., and (3) from 10 to 700 parts by weight of a particulate, solid, void-producing matter per 100 combined parts by weight of said gum and said filler, said particulate matter being solid at the curing temperature of said gum and insoluble in said gum and non-reactive therewith, said particulate matter being selected from the class consisting of (a) solid matter which is essentially completely soluble in water and (b) solid matter which is essentially completely volatilizable at a temperature above the curing temperature of said gum and below about 500° F.

2. The composition in accordance with claim 1 wherein said gum is curable to an elastomer by means of an organic peroxide and said composition contains an organic peroxide curing agent.

3. The composition in accordance with claim 1 wherein said gum is curable to an elastomer at room temperature and said composition contains as a curing agent (1) a member selected from the class consisting of tetra-alkyl silicates and polysilicates and (2) a metal salt of an aliphatic acid.

4. The composition in accordance with claim 1 wherein said composition contains up to 140 parts by weight (per 100 parts by weight organopolysiloxane gum) of a non-reinforcing filler, said non-reinforcing filler being solid, water-insoluble and non-volatile at temperatures below 500° F.

5. The composition in accordance with claim 1 wherein said composition contains from 2 to about 20 parts by weight (per 100 parts by weight of said void-producing matter) of a processing aid selected from the class consisting of alkali metal salts of hydrocarbon carboxylic acids wherein the hydrocarbon moiety contains from 8 to about 24 carbon atoms; alkali metal salts of hydrocarbon sulfonic acids wherein the hydrocarbon mioety contains from 8 to about 24 carbon atoms; a non-ionic neutral surfactant having the formula:

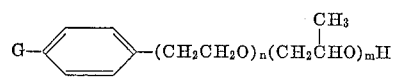

wherein G is an alkyl group containing from 8 to 16 carbon atoms, $n$ is an integer having a value of from 0 to about 100, $m$ is an integer having a value of from 0 to about 50 and the sum of $n$ and $m$ is from at least 4 to about 100; a non-ionic neutral surfactant having the formula:

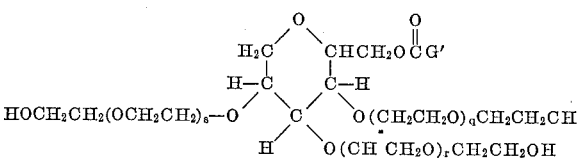

wherein G' is a saturated or unsaturated aliphatic hydrocarbon group containing from 8 to about 24 carbon atoms and $q$, $r$ and $s$ are integers each having a value of 4 or greater; sorbitan monooleates; sorbitan monostearates; sorbitan monolaurates; acetylated lanolin alcohols; polyethlyene glycol tert-dodecyl thioether; mono-, di-, and trihydroxy substituted alkanes containing from one to about 6 carbon atoms; organo-substituted hydroxysilanes; organo-substituted polysiloxanes containing from two to about 35 silicon atoms per molecule; organo-substituted alkoxysilanes; organo-substituted alkoxypolysilanes containing from two to about 35 slicon atoms per molecule; and low molecular weight trihydrocarbon end-blocked dihydrocarbonpolysiloxane oils having the formula:

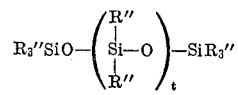

wherein R is a member selected from the group consisting of alkyl and aryl radicals and $t$ is an integer having a value of from 4 to about 20.

6. A composition of mateer curable to a silicone elastomer which comprises in admixture, (1) an organopolysiloxane gum, (2) from 20 to 50 parts by weight of a reinforcing filler per 100 parts by weight of said gum, said filler being solid, water-insoluble and non-volatile at temperatures below 500° F., and (3) from 10 to 500 parts by weight of a particulate, solid, void-producing matter per 100 combined parts by weight of said gum and said filler, said particulate matter being solid at the curing temperature of said gum, being insoluble in said gum and non-reactive therewith and being essentially completely volatilizable at a temperature above the curing temperature of said gum and below about 500° F.

7. A composition of matter curable to a silicone elastomer which comprises in admixture, (1) an organopolysiloxane gum, (2) from 20 to 50 parts by weight of a reinforcing filler per 100 parts by weight of said gum, said filler being solid, water-insoluble and non-volatile at temperatures below 500° F., and (3) from 10 to 500 parts by weight of a particulate, solid, void-producing matter per 100 combined parts by weight of said gum and said filler, said particulate matter being solid at the curing temperature of said gum, being insoluble in said gum and non-reactive therewith and being completely soluble in water.

8. A composition of matter curable to a silicone elastomer which comprises in admixture, (1) an organopolysiloxane gum, (2) from 20 to 50 parts by weight of a reinforcing filler per 100 parts by weight of said gum, said filler being solid, water-insoluble and non-volatile at temperatures below 500° F., and (3) from 10 to 500 parts by weight of particulate urea.

9. A process for producing dimensionally stable, cellular silicone elastomers which comprises (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 700 parts by weight of a particulate, solid, void-producing matter per 100 combined parts by weight of said gum and said filler, said particulate matter being solid at the curing temperature of said gum and being insoluble in said gum and non-reactive therewith, said particulate matter being selected from the class consisting of (d) solid matter which is essentially completely soluble in water and (e) solid matter which is essentially completely volatilizable at a temperature above the curing temperature of said gum and below about 500° F., (2) curing said admixture to an elastomer and (3) removing essentially all of said particulate, solid, void-producing matter from the cured silicone elastomer leaving cells therein of substantially the same dimensions as the particulate, solid, void-producing matter removed from said cured elastomer.

10. A process in accordance with claim 9 wherein said admixture contains up to 140 parts by weight (per 100 parts by weight organopolysiloxane gum) of a non-reinforcing filler, said non-reinforcing filler being solid, water-insoluble and non-volatile at temperatures below 500° F.

11. A process in accordance with claim 9 wherein said admixture contains from 2 to about 20 parts by weight (per 100 parts by weight of said void-producing matter) of a processing aid selected from the class consisting of alkali metal salts of hydrocarbon carboxylic acids wherein the hydrocarbon moiety contains from 8 to about 24 carbon atoms; alkali metal salts of hydrocarbon sulfonic acids wherein the hydrocarbon moiety contains from 8 to about 24 carbon atoms; a non-ionic neutral surfactant having the formula:

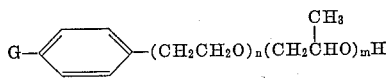

wherein G is an alkyl group containing from 8 to 16 carbon atoms, n is an integer having a value of from 0 to about 100, m is an integer having a value of from 0 to about 50 and the sum of n and m is from at least 4 to about 100; a non-ionic neutral surfactant having the formula:

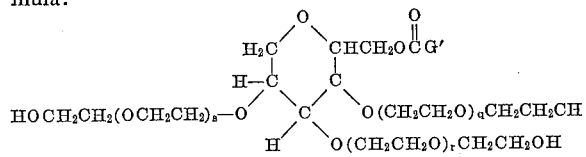

wherein G' is a saturated or unsaturated aliphatic hydrocarbon group containing from 8 to about 24 carbon atoms and q, r and s are integers each having a value of 4 or greater; sorbitan monooleates; sorbitan monostearates; sorbitan monolaurates; acetylated lanolin alcohols; polyethylene glycol tert-dodecyl thioether; mono-, di-, and tri-hydroxy substituted alkanes containing from one to about 6 carbon atoms; organo-substituted hydroxysilanes; organo-substituted polysiloxanes containing from two to about 35 silicon atoms per molecule; organo-substituted alkoxysilanes; organo-substituted alkoxypolysiloxanes containing from two to about 35 silicon atoms per molecule; and low molecular weight trihydrocarbon end-blocked dihydrocarbonpolysiloxane oils having the formula:

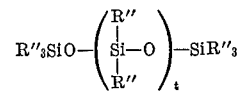

wherein R is a member selected from the group consisting of alkyl and aryl radicals and $t$ is an integer having a value of from 4 to about 20.

12. A process for producing dimensionally stable, cellular silicone elastomers which comprises (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 500 parts by weight of a particulate, solid, void-producing matter per 100 combined parts by weight of said gum and said filler, said particulate matter being solid at the curing temperature of said gum, being insoluble in said gum and non-reactive therewith, and being essentially completely volatilizable at a temperature above the curing temperature of said gum and below about 500° F., (2) curing said admixture to an elastomer and (3) removing essentially all of said particulate, solid, void-producing matter from the cured silicone elastomer leaving cells therein of substantially the same dimensions as the particulate, solid, void-producing matter removed from said cured elastomer, said solid matter being removed by heating said cured elastomer at a temperature above the curing temperature of said elastomer and below about 500° F.

13. A process in accordance with claim 12 wherein said particulate, solid, void-producing matter is urea.

14. A process in accordance with claim 12 wherein said particulate, solid, void-producing matter as phthalic anhydride.

15. A process in accordance with claim 12 wherein said particulate, solid, void-producing matter is ammonium chloride.

16. A process in accordance with claim 12 wherein said particulate, solid, void-producing matter is oxalic acid.

17. A process for producing dimensionally stable, cellular silicone elastomers which comprises (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 500 parts by weight of a particulate, solid, void-producing matter per 100 combined parts by weight of said gum and said filler, said particulate matter being solid at the curing temperature of said gum, being insoluble in said gum and non-reactive therewith, (2) curing said admixture to an elastomer and (3) removing essentially all of said particulate, solid, void-producing matter from the cured silicone elastomer leaving cells therein substantially the same dimensions as the particulate, solid, void-producing matter removed from said cured elastomer, said solid matter being removed by leaching said cured elastomer with water.

18. A cured, dimensionally stable, cellular silicone elastomer produced by the steps of (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 700 parts by weight of a particulate, solid, void-producing matter per 100 combined parts by weight of said gum and said filler, said particulate matter being solid at the curing temperature of said gum and being insoluble in said gum and non-reactive therewith, said particulate matter being selected from the class consisting of (d) solid matter which is essentially completely soluble in water and (e) solid matter which is essentially completely volatilizable at a temperature above the curing temperature of said gum and below about 500° F., (2) curing said admixture to an elastomer and (3) removing essentially all of said particulate, solid, void-producing matter from the cured silicone elastomer leaving cells therein of substantially the same dimensions as the particulate, solid, void-producing matter removed from said cured elastomer, said cured elastomer being characterized by having uniform density and having substantially the same volume as said uncured admixture.

19. A cured, dimensionally stable, cellular silicone elastomer produced by the steps of (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 500 parts by weight of a particulate, solid, void-producing matter per 100 combined parts by weight of said gum and said filler, said particulate matter being solid at the curing temperature of said gum, being insoluble in said gum and non-reactive therewith and being essentially completely volatizable at a temperature above the curing temperature of said gum and below about 500° F., (2) curing said admixture to an elastomer and (3) removing essentially all of said particulate, solid, void-producing matter from the cured silicone elastomer leaving cells therein of substantially the same dimensions as the particulate, solid, void-producing matter removed from said cured elastomer, said solid matter being removed by heating said cured elastomer at a temperature above the curing temperature of said elastomer and below about 500° F., said cured elastomer being characterized by having uniform density and having substantially the same volume as said uncured admixture.

20. A cured, dimensionally stable, cellular silicone elastomer produced by the steps of (1) forming an admixture of (a) an organopolysiloxane gum, (b) from 20 to 50 parts by weight of a reinforcing filler per 100 parts by weight of said gum, said filler being solid, water-insoluble and non-volatile at temperatures below 500° F. and (c) from 10 to 500 parts by weight of a particulate, solid, void-producing matter per 100 combined parts by weight of said gum and said filler, said particulate matter being solid at the curing temperature of said gum, being insoluble in said gum and non-reactive therewith, and being essentially completely soluble in water, (2) curing said admixture to an elastomer and (3) removing essentially all of said particulate, solid, void-producing matter from the cured silicone elastomer leaving cells therein of substantially the same dimensions as the particulate, solid, void-producing matter removed from said cured elastomer, said solid matter being removed by leaching said cured elastomer with water, said cured elastomer being characterized by having uniform density and having substantially the same volume as said uncured admixture.

References Cited by the Examiner
UNITED STATES PATENTS

| | | | |
|---|---|---|---|
| 2,329,322 | 9/1943 | Baty et al. | 260—2.5 |
| 2,517,753 | 8/1950 | Ximenez et al. | 260—2.5 |
| 2,542,527 | 2/1951 | Honey et al. | 260—2.5 |
| 2,554,485 | 5/1951 | Wilson | 260—2.5 |
| 2,568,672 | 9/1951 | Warrick | 260—2.5 |
| 2,653,987 | 9/1953 | Baty | 260—2.5 |
| 2,676,929 | 4/1954 | Duddy | 260—2.5 |
| 2,766,485 | 10/1956 | Jevelot | 260—2.5 |
| 2,875,163 | 2/1959 | Berridge | 260—2.5 |

MURRAY TILLMAN, *Primary Examiner.*

UNITED STATES PATENT OFFICE
CERTIFICATE OF CORRECTION

Patent No. 3,238,157                      March 1, 1966

Frederick A. Smith

It is hereby certified that error appears in the above numbered patent requiring correction and that the said Letters Patent should read as corrected below.

Column 1, line 19, for "silicon" read -- silicone --; column 6, line 62, for "hexadencyl" read -- hexadecyl --; colum 11, line 9, strike out "A"; line 10, for "CMPOUND" read -- COMPOUNDS --; line 62, for "silicon" read -- silicone --; line 66, for "elastomers" read -- elastomer --; column 12, line 10, after "lower)" insert -- were added --; line 39, after "screen) insert -- were added --; line 74, after "mixture" insert -- wer added --; column 13, line 17, for "2,4-dichlohobenzoyl" read -- 2,4-dichlorobenzoyl --; line 21, after "thick)" insert -- were added --; line 40, after "mixture" insert -- were added -- line 60, after "mesh)" insert -- were added --; column 14, line 2, after "lower)" insert -- were added --; column 16, line 11, for "despersion" read -- dispersion --; line 34, for "valves" read -- values --; line 68, for "was" read -- were --; column 1 line 38, for "surcose" read -- sucrose --; line 56, for "silicol read -- silicone --; column 20, line 57, for "mateer" read -- matter --; same column 20, lines 28 to 35, and column 21, lines 60 to 65, the formulae should appear as shown below instead of as in the patent:

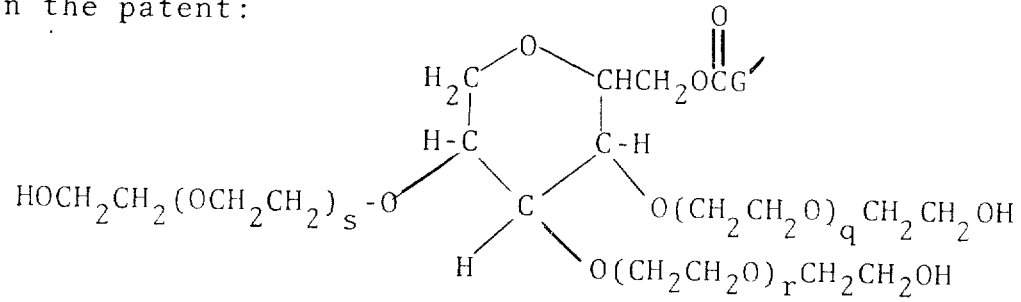

Signed and sealed this 1st day of August 1967.

(SEAL)
Attest:

EDWARD M. FLETCHER, JR.  
Attesting Officer

EDWARD J. BRENNER  
                                        Commissioner of Patents